May 3, 1932.  A. B. D'IPPOLITO  1,856,412
SIDEWALK EDGE ROUTER
Filed April 20, 1931
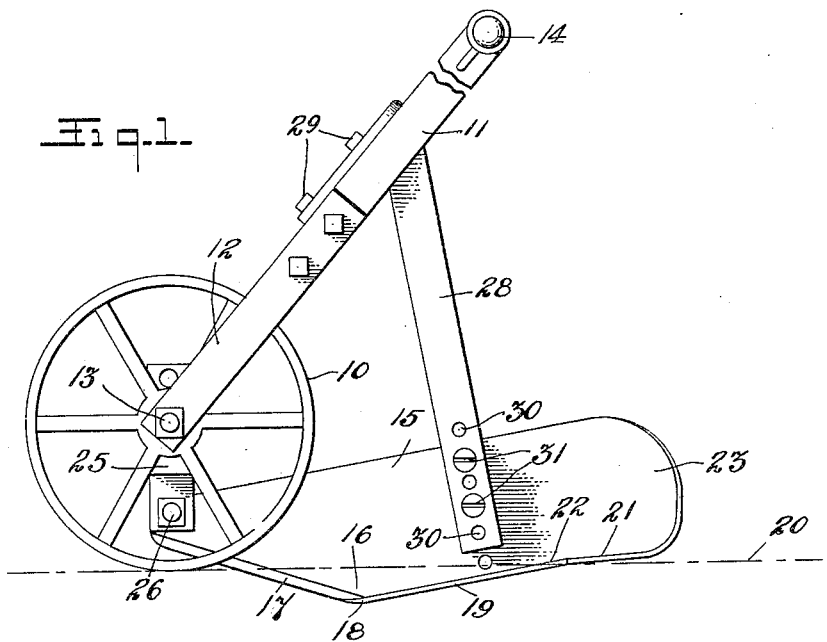
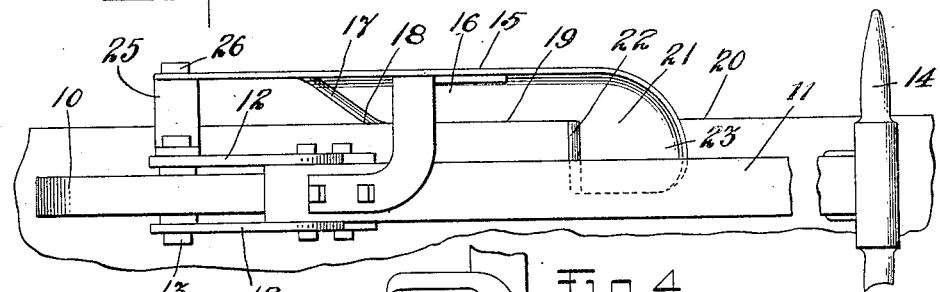
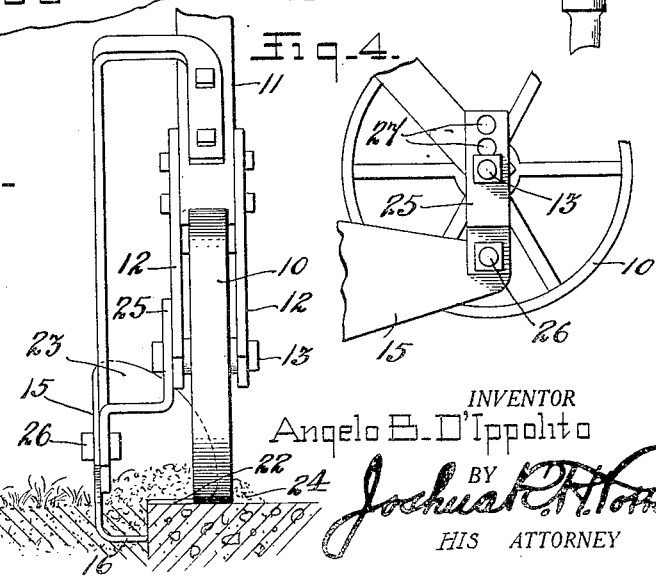
WITNESS:
INVENTOR
Angelo B. D'Ippolito
BY
HIS ATTORNEY Patented May 3, 1932

1,856,412

UNITED STATES PATENT OFFICE

ANGELO B. D'IPPOLITO, OF VINELAND, NEW JERSEY

SIDEWALK EDGE ROUTER

Application filed April 20, 1931. Serial No. 531,474.

This invention relates to side walk edge routers, and has for an object to provide improved means for cutting the grass and other vegetation along the edge of a side walk, and at the same time, routing a groove by lifting the dirt collected together with the vegetation and depositing them upon the side walk in a line removed from the edge.

A further object of the invention is to provide in a router, a guide employed in the routing tool which properly positions itself against the outer edge of the side walk and therefore, insures uniformity of routing.

A further object of the invention is to provide a router having a depth gauge by which uniform depth of cut is provided.

A further object of the invention is to provide improved means for varying the height of the propelling handle to accommodate users of different heights.

The invention therefore, comprises a wheeled support, such wheel operating as a depth gauge, with a cutter member adjustable relative to the wheel for varying the depth of cut, and a straight edge extending from one cutting position to another, said straight edge following the outer line of the side walk when in use as a lateral guide.

The invention is directed to other objects, and possesses other features of novelty and advantage, some of which, together with the foregoing, will be hereinafter more fully set forth.

In the drawings:—

Figure 1 is a view of the device in side elevation seen from the side walk side when in use, Figure 2 is a top plan view, Figure 3 is a view in front end elevation, and Figure 4 is a fragmentary view showing the depth adjusting structure.

Like characters of reference indicate corresponding parts throughout the several views.

The vehicle, which supports the routing tool, comprises a wheel 10 journaled upon a handle 11 in any approved manner as by providing a fork 12 as the forward end of the handle between the bifurcations of which fork the wheel is journaled upon the axle, represented at 13. While not essential to the invention, the handle 11 is also provided with propelling handles 14 of the type usually found in such implements.

The routing tool, which is attached to the vehicle, comprises an integral member having a side 15, the lower edge of which is curved toward the wheel as at 16. The curved portion 16 stops short of the forward end of the plate 15, and is provided with an inclined knife edge 17.

The corner at 18, which is at the rearward end of the knife 17 is preferably slightly rounded as shown, and merges into a straight edge 19 which forms a guide along the edge of the side walk 20, as shown more particularly at Figure 2, with the corner 18 extending below the side walk line, as indicated at Figure 1, such corner 18 being the lowermost reach of the routing implement. Rearwardly, an offset 21 is provided having a knife edge 22 which slides along the upper surface of the side walk when in motion, as indicated at Figure 1, and in conjunction with the wheel 10 serves as a gauge for controlling the depth of cut. This knife edge extending over the side walk a distance serves to sever any grass or vegetation which may extend over the corner of the walk.

The plate 15 at this rearward end is spooned as at 23, forming an inclined delivery for depositing the material upon the edge of the side walk, as indicated at 24 in Figure 3. It will, therefore, be seen that the knife 17 extending from the outer edge of the groove to the side walk will sever the roots of grass or other vegetation, and by reason of the inclination of the side, bounded by the straight edge 19, will lift it to the level of the side walk and knife edge 22, not only will then serve to disconnect any growing vegetation, but will also serve to maintain the loosened material in such position that the spooned extremity 23 will force it laterally to the position shown at 24 in Figure 3.

The depth of cut is adjusted by means of the strap 25 which is pivoted to the forward end of the routing tool at 26, and provided with a plurality of openings 27 which are engaged upon the axle 13, and by adjusting to other of said openings, the depth of cut is thereby varied.

The position of the handle 11 above the side walk is determined by the distance of the knife edge to said handle. This, however, may be varied by the employment of the brace which is rigidly secured to the handle at 29 and provided with a plurality of perforations 30 which accommodate bolts 31 so that by removing said bolts, others of said perforations 30 may be employed, and the handle varied in its angular relation to the routing tool by placing the bolts in such of said perforations as may be indicated.

The routing formed along the edge of a side walk is, of course, for improving the looks of the grounds by clearly defining the line between the side walk and the adjoining sward. Such appearance is greatly enhanced by uniformity of routing, and the present invention is, therefore, particularly directed to a structure which will provide this uniformity both as to depth and width of the route. While the depth may be varied by the adjustment described, the width will be determined by the straight edge 19 moving along the outer edge of the walk and, therefore, maintaining the cutting edge 17 in fixed position relative to such edge. The edge 19 therefore operating as a guide for the sake of uniformity of width or route, is one of the important features of the invention.

In operation, of course, the device is manually propelled along adjacent to the edge of the side walk represented at 20, with the wheel 10 traveling upon the side walk, and the point 18 depending to a position below the level of the side walk and spaced therefrom as provided by the guide edge 19. This provides a uniform cut as the device is advanced, the material cut out by such knife edge 17 being forced up the incline and deposited upon the side walk as shown, from which position it may be readily and conveniently moved.

Of course, the side walk edge router, herein illustrated, may be modified in various ways without departing from the invention herein set forth and hereinafter claimed.

The invention is hereby claimed as follows:

A side walk edge router comprising a wheeled vehicle, a routing implement carried by the vehicle, means forward of the routing edge to adjust the depth of cut, means inherent in said router to form a guide to travel along in engagement with the vertical edge of the walk, a spooned rear end formed upon said router adapted to move the removed material to a position spaced from the edge of the walk, and a cutter moving along the top surface of the walk in the rear of the routing edge.

In testimony whereof I have signed my name to this specification.

ANGELO B. D'IPPOLITO.